Jan. 8, 1924. 1,480,188
A. E. SPINASSE
APPARATUS FOR DRAWING AND TAKING DOWN GLASS CYLINDERS
Filed March 29, 1917 2 Sheets-Sheet 1
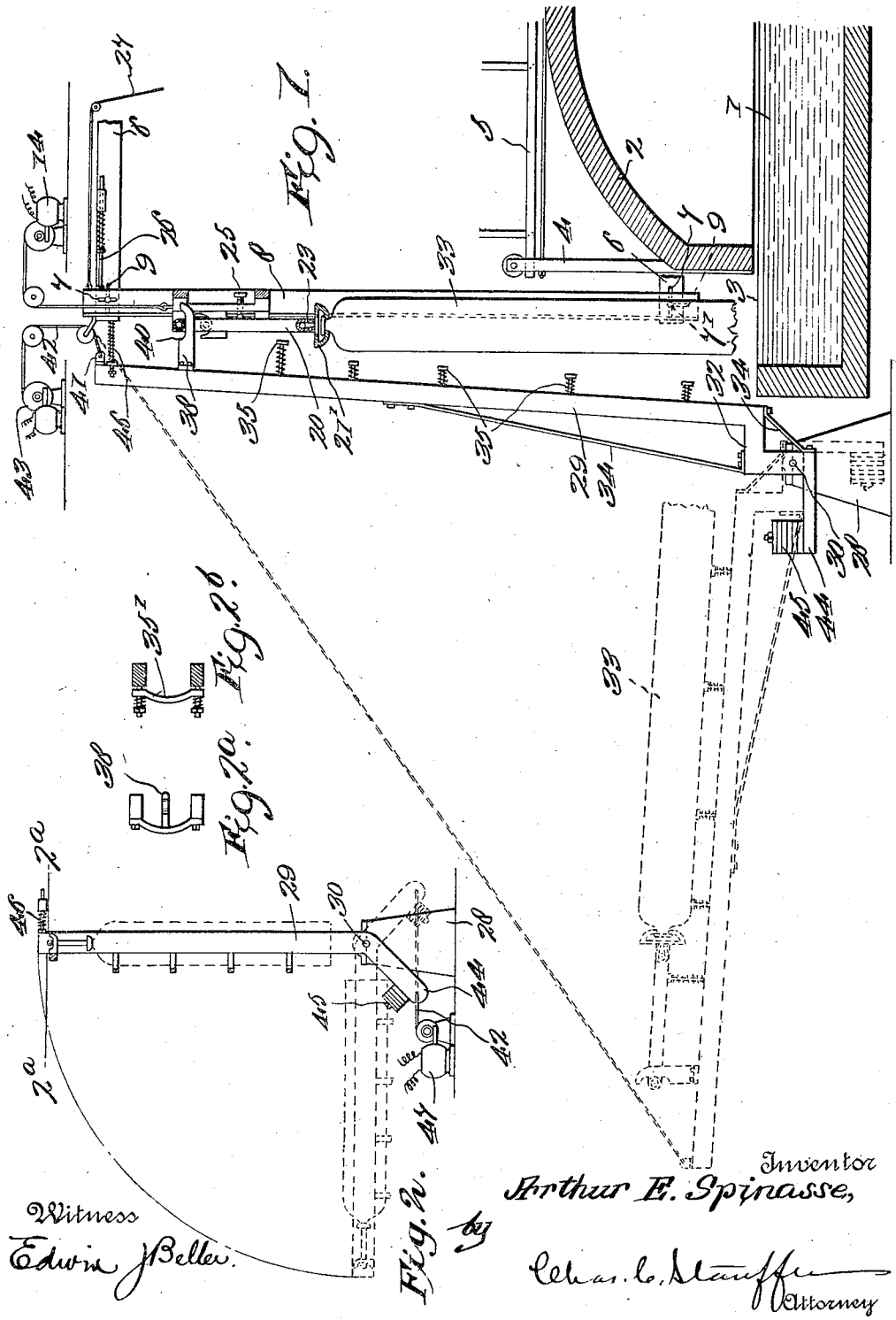
Inventor
Arthur E. Spinasse,
Witness
Edwin J Beller
Chas. C. Stauffer
Attorney Jan. 8, 1924. 1,480,188
A. E. SPINASSE
APPARATUS FOR DRAWING AND TAKING DOWN GLASS CYLINDERS
Filed March 29, 1917 2 Sheets-Sheet 2
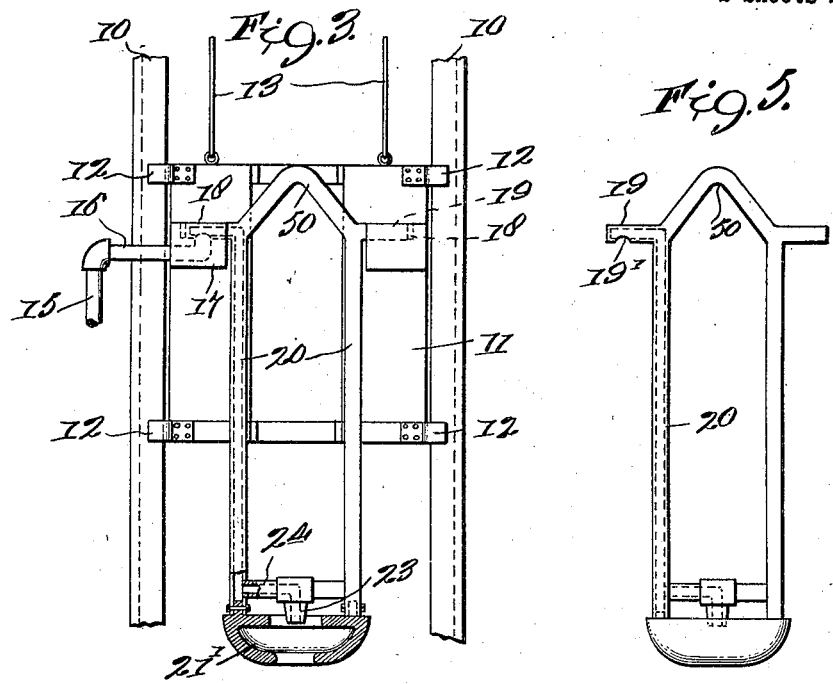
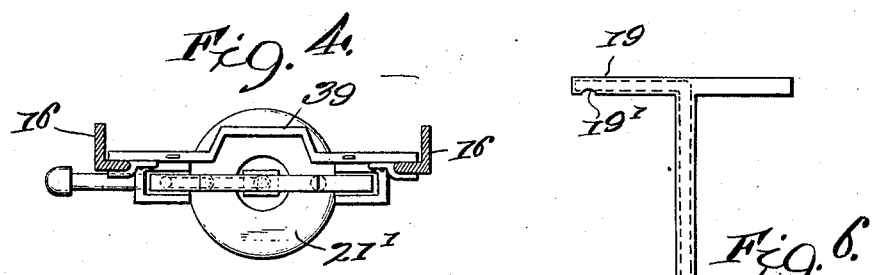
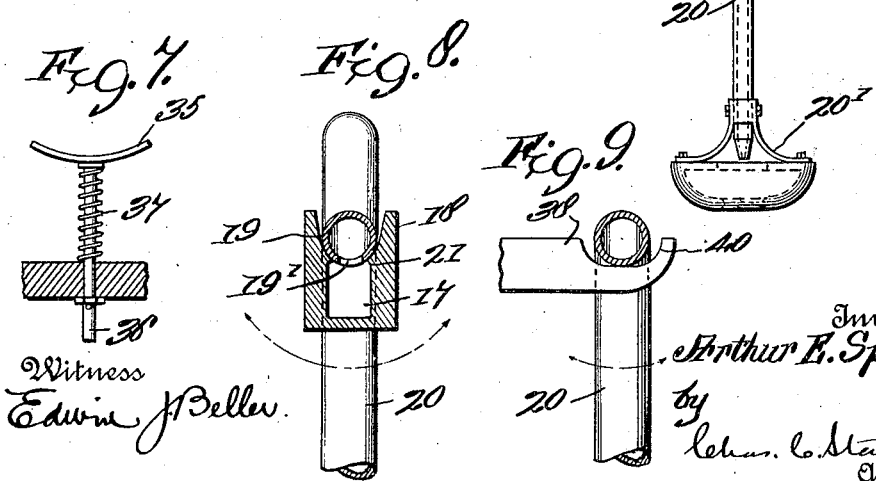

Patented Jan. 8, 1924.

1,480,188

UNITED STATES PATENT OFFICE.

ARTHUR E. SPINASSE, OF MOUNT VERNON, OHIO.

APPARATUS FOR DRAWING AND TAKING DOWN GLASS CYLINDERS.

Application filed March 29, 1917. Serial No. 158,425.

*To all whom it may concern:*

Be it known that I, ARTHUR E. SPINASSE, a citizen of the United States, residing at Mount Vernon, county of Knox, State of Ohio, have invented certain new and useful Improvements in Apparatus for Drawing and Taking Down Glass Cylinders; and I do hereby declare the following to be a full, clear, and exact description of the invention, such as will enable others skilled in the art to which it appertains to make and use the same.

My invention relates to process and apparatus for drawing and taking down glass cylinders. As is well known in the art, a glass cylinder drawn in the usual way is an exceedingly fragile object. It is large and heavy, running sometimes to weights varying from 400 to 500 pounds, the glass is not tempered or annealed, and numerous stresses are necessarily developed in the glass during the cooling owing to minute variations in the quality of the glass at different points, or minute variations in the temperature of the atmosphere surrounding the cylinder. The annealing, of course, removes or relieves these stresses, but before annealing they are the cause of a great deal of loss in window glass factories, as the slightest jar on the cylinder is apt to start a crack which may spread through many square feet of glass, and even through a whole cylinder. It is desirable then, after the cylinder is drawn, that it be taken down as quickly and as gently as possible.

Another feature which should be considered in drawing glass cylinders is the variation of conditions which determine the thickness and consistency of the walls of the cylinder at different points. Glass, in a glass tank, is always of variable quantity as to composition and consistency, and this variation is accentuated by conditions in the glass factory where drafts are of constant occurrence and where these drafts chill the walls of the cylinder as they strike the latter, invariably in accordance with the speed, direction and temperature of such drafts. Other conditions also modify the cylinder being produced. The bottom of the cylinder, the genesis of it, may start to travel also across the path from one side to the other.

I have discovered that by varying the path of the bait during draw. I may counteract, to a large extent, the effects of these variation producing causes, and I have accordingly devised a frame upon which the track over which the traveling carriage is mounted, which frame can be adjusted in position either vertically, horizontally or obliquely, in any direction, so as to give the track over which the bait carriage moves, a path adapted to carry the bait out of the perpendicular in a given direction so as to afford some compensation for the influences indicated above.

I have also devised means whereby the take-down frame may be moved into proper position with respect to the cylinder, means whereby the cylinder may be transferred to the take-down frame without jar, and means whereby the take-down frame may approach its final position under gentling or steadying influence and stop without jar.

I have also invented a bait of a construction adapted for use in connection with the present apparatus.

My invention also covers the process by which the variation effects indicated are attained.

In the drawings:

Figure 1 is a side view of my apparatus;

Figure 2 is a view of a modification thereof;

Figures 2$^a$ and 2$^b$ are top views of supports on lines 2$^a$—2$^a$ and 2$^b$—2$^b$ of Figure 2, respectively;

Figure 3 is a detail showing the bait and carriage;

Figure 4 is a top or plan view of the carriage;

Figure 5 is a view of the bait and handle detached;

Figure 6 is a modification of the bait and handle shown in Figure 5;

Figure 7 is a detail showing the cushion on the take-down frame;

Figure 8 is an enlarged view in cross section showing the connection between the bait handle and air supply; and Figure 9 is a detail showing how the bait handle is supported in relation to the take-down frame.

In the drawings, 1 is a tank or pool of melted glass over which is the hood or cover 2, movable to the right or left to uncover at 3 sufficient of the tank to permit drawing, this hood being carried by supports 4 on track 5 in the well known manner.

Directly over, or at least in proper relation to the drawing space or opening 3, I provide supports 6 in suitable number, fixed to any proper part of the structure and slotted as shown at 7. I provide a frame 8, which forms the carriage supporting frame, with slots 9 adapted to register with the slots 7 aforesaid; and there are two or more pairs of these slots 7 and 9, one at the upper part and one at the lower part of the frame. I pass a bolt through these slots whereby the frame may be adjusted and bolted in any angular position within the range of the slots. This provides an inclination on a vertical plane in desired direction for the frame.

On the frame I have a track 10, or rather the sides of the frame may constitute such track, and upon this track slides the bait carriage 11. This carriage has guides 12 at its upper and lower part and is supported by cables 13 which extend up and over pulleys to a suitable motor 14, or other means for raising.

At 15 I provide an air pipe which is jointed or otherwise flexible to follow the bait carriage in its upward and downward movement, being connected at its remote end to a suitable air supply not shown. At 16 I have shown this pipe as discharging into a box 17, the upper part of which box is formed to make bearing 18. I show such bearing on but one side, although I may obviously have one on each side. This bearing is slotted at 21 to communicate with box 17, and resting in this bearing 18, on each side, is an arm 19 of the bait support 20. This arm 19, at least on one side, and it may be on both sides, is made of piping, as shown, and this piping is in open communication at slot 21 with the box 17. Air connection to the bait may be established through either or both bearings 18 and arms 19. To the lower end of this piping is attached my bait 21', which may be of any of the usual kinds, preferably a cold bait.

The bait 21', on its upper side, or in fact wherever preferred, is provided with an opening 22. Entering this opening, or at least in injection or air supplying relation to said opening, is a pipe 23 in open communication through connection 24 with the piping of the bait support 20. By this means it will be seen that air may be supplied to the interior of the bait and hence to the interior of the cylinder being drawn, in desired quantity and under slight pressure.

The bait support 20 is shown preferably in the form indicated in Figures 3 and 5, that is its upper part or handle 50 is somewhat A-shaped for a purpose which will be discussed later.

It will be seen that when the motor 14 is actuated the carriage having the bait thereon hung or suspended by the parts 19 resting in the bearings 18, may move up and down at a speed determined by the speed of the motor. It will also be seen that by adjusting the inclination of the frame in any compensated position desired, the path of movement of the bait may be varied to suit drawing conditions.

In Figure 6 I show a modification of my bait support in which but a single tube 20 is used, the tube being brought into supporting relation to the bait by the brackets 20' and provided with the arms 19 as indicated. The difference between this and previously described bait support is that but one supporting tube is used. The arm or branch shown in Figure 6 to the left, is shown provided with the opening 19' corresponding to the opening 19' shown in Figure 8, and for the same purpose, namely, the admission of air to the bait. In this case I prefer to use two supporting arms 38 on the take-down frame to engage the horizontally extending arms 19 of the bait. The bearings 18 and the arms 19 engaging them should be so proportioned as to permit little or no lateral motion of the bait support, while at the same time permitting swinging of the bait and its attached cylinder, as indicated by the curved dotted lines in Figures 8 and 9, in one plane.

Figure 9 is a partial enlarged view showing the recess 40 in the arm 38 of the take-down frame, showing the manner in which the handle 19 of the bait are supported to permit movement of the bait and cylinder in the take-down act of the take-down apparatus, whereby the bait and cylinder may move and swing or oscillate gently to proper resting position on the cushions 35 of the take-down apparatus.

At 25 I provide an adjustable screw to limit the swinging motion of the bait frame towards the tank side. At 26 I provide a spring supported rod tending to press against the frame 8 to press said frame towards the drawing opening 3. I also provide, connected with the frame, a cable 27 which may be led to a windlass or other suitable source of power. This construction permits adjustment of the frame while the drawing carriage is moving upward with a draw or cylinder, the bolts which hold the frame to the support 6 being, of course, loosened enough to permit this.

If I do not desire to use the variable adjustment, I simply fix the frame to the desired position, screw the bolts 7' home, and retain the frame thus in rigid position.

At a suitable position near the tank, I provide a foundation 28, and upon this foundation I pivot my take-down frame 29 at a point 30. This take-down frame consists of a bar 31 long enough to reach the top of the carriage supporting frame approximately, and this frame is shown stepped, as indicated at 32. This stepped construction permits several things. The vertical part of the stepped portion serves to bridge, in part at least, the horizontal distance between the pivot and the drawing center, and this permits me to mount the foundation and pivot 30 further away from the tank, whereby the effect of heat upon the take-down frame and its mechanism is avoided, and also permits me, when the take-down frame is lowered, to bring the cylinder 33 to rest at a height and distance convenient for the workman to cut it up or divide it.

When the take-down frame is swung up the stepped feature permits me to swing the frame, as shown in Figure 1, closer to and nearly parallel to the cylinder, so that cylinders of any size may move to proper position with respect to the take-down without much swinging movement or jar when they meet, thereby avoiding a prolific source of breakage. I provide suitable braces 34. On said frame I provide the spring supported yokes 35 for the cylinder and the bait, construction of which is obvious, and which consists of the yoke and the stem 36 and spring 37 between the yoke and the take-down frame. These spring supported yokes are sufficiently numerous to support the cylinder without putting undue strains upon any part of the cylinder, and each one will yield, as is obvious, and accommodate itself to the peculiarity of the cylinder at that point, so that even a much curved cylinder can be taken down easily.

I provide on the take-down frame an arm or arms 38 extending substantially at right angles to said frame and inward when the frame is in its substantially vertical position. This arm is arranged so that when the bait is drawn to its full height and the take-down frame moved to its upper position, said arm will project beneath the A-shaped portion 50 of the bait support, the bracing of the carriage being recessed at 39 to permit this. The upper position of the take-down frame may, as seen in Figure 1, be somewhat past the vertical, or it may be substantially vertical as in Figure 2. It is obvious also that the take-down frame may be arranged to stop short of the vertical in its uppermost position.

At the termination of the draw, the carriage carrying the cylinder and bait has reached the upper limit of its movement. This affords opportunity for the arm 38 to be thrust into the bait frame below the A-shaped portion 50 thereof, when, by actuating motor 43, the take-down frame is brought into the vertical or past vertical position with respect to pivot 30 of the take-down. The motor 14 is then reversed and the carriage is lowered at low speed. The bait handle 50 soon comes to rest in recess 40 of the support or arm 38; the take-down frame is now caused to swing down by means of motor 43, and the bait with the article or cylinder drawn swings more or less and comes to rest upon the resilient or spring supports on the take-down frame during the take-down act, and when it reaches horizontal position, the cylinder is entirely supported on said supports. There may be various arrangements of the counterweight. The counterweight 45, as described below, may be so placed that it tends to counterbalance the weight of the cylinder and take-down apparatus at the end of the take-down movement. The weight may over-balance the cylinder and take-down apparatus. I prefer to make the weight 45 such that it will tilt down or over-balance the take-down 29 supporting a cylinder 33, relying on said cable to maintain or raise said take-down to or past vertical and lower it to a position horizontal. I may also, if I wish, secure my cable in or about the middle of the take-down.

It will be observed that my arm 38 is shown provided with a wide socket or recess 40, which forms a sort of track or extended bearing, upon which the A-shaped portion of the bait support rests, and upon which it may oscillate with a rolling movement, thereby avoiding any shock or jar incident to a pivoting movement where the pivot sometimes checks or pinches, thereby starting cracks in the cylinder.

At the upper or outer end of the frame 31 Fig. 2 I provide an eye 41, to which I attach a cable 42 leading to a motor or drum 43. At the lower end of the take-down frame, and extending at an oblique angle thereto, I provide an arm 44 on the opposite side of the pivot, and upon said arm 44 I mount a counterweight 45. By making the arm 44 oblique with respect to the frame 29, it will be seen that the said frame is in counterbalanced position when the cylinder comes in contact with the spring supported yokes 35, and thus vibration is checked as the weight of said counterweight is sufficient to counterbalance the take-down frame and any part of the cylinder and bait also. As the said take-down frame is moved about its pivot by said counterweight, the counterweight, in the position indicated in dotted lines in Figure 1, arrives at its dead point, that is at the point where the weight is ineffective. The frame continues its downward movement, however, and is finally brought to rest with the said counterweight extending beyond said dead point as it would be to the right in Figure 1, thus permitting the frame to reach its final position under the gentling influence of the counterweight.

At the outer end of the frame I may provide a spring 46, if I wish, which has the effect of engaging some fixed portion of the building or frame, thereby buffing the action of the take-down frame when it comes to a vertical position. By winding on the cable 42 I may compress this spring 46 also, so that when the cable is released said spring will have the effect of pushing or starting the take-down frame away and towards the vertical position. The spring is a buffer.

In the modification shown in Figure 2, I have shown the counterweight arranged at a somewhat different angle from that shown in Figure 1, and I have shown also the spring supported yokes of a different shape and position, that is behind the frame instead of in front. I also show at the bottom of this figure a motor and drum 47 which may be attached to the arm 44, using this instead of the motor 43 attached to the upper end of the frame, as shown in Figure 1. This is a matter dependent upon the weight and position of the counterweight on the arm 44.

It will thus be seen that I have devised and invented an apparatus by means of which the path of the cylinder may be determined or modified in order to accord with the requirements of the drawing conditions; that I have provided a take-down frame which may be moved up to the cylinder after it is drawn, and into engagement with which the cylinder may be moved with the greatest gentleness, and upon which the cylinder may be lowered under very gentle control and finally come to rest with the greatest ease and gentleness.

Having thus described my invention, what I claim and desire to secure by Letters Patent of the United States, is:

1. In an apparatus for drawing and taking down glass cylinders, in combination, a vertical frame, adjustable in a vertically inclined plane to compensate for variations in conditions affecting draw to vary the path of the bait during the draw, a drawing carriage mounted to gradually and automatically travel up said frame, in a path determined by the adjustment of the vertical frame, a take-down frame, adapted to be moved into proper relation to the vertical frame, an arm on said take-down frame, adapted to support the bait, and means whereby the bait may be brought into engagement with said arm.

2. In an apparatus for drawing and taking down glass cylinders, in combination, a vertical frame, adjustable in a vertically inclined plane to compensate for variations in conditions affecting draw to vary the path of the bait during the draw, a drawing carriage mounted to gradually and automatically travel up said frame, in a path determined by the adjustment of the vertical frame, a bait on said drawing carriage, a looped handle on said bait, a take-down frame adapted to be moved into proper relation to the cylinder on the vertical frame, an arm on said take-down frame, adapted to engage said looped handle, to support the bait and cylinder, and means whereby said arm and bait may be brought into engagement.

3. In an apparatus for drawing and taking down glass cylinders, in combination, a vertical frame, adjustable in a vertically inclined plane to compensate for variations in conditions affecting draw to vary the path of the bait during the draw, a drawing carriage mounted to gradually and automatically travel up said frame, in a path determined by the adjustment of the vertical frame, a bait on said carriage, said bait provided with an air admitting opening, a tubular support for said bait, means connected with said support whereby air may be forced through said support and injected into the bait opening to supply air under non-vibrating conditions to the bait, a take-down frame, an arm on said frame, adapted to engage the tubular support, and means whereby said arm and support may be brought into engagement.

4. In an apparatus for drawing and taking down glass cylinders, in combination, a vertical frame, adjustable in a vertically inclined plane to compensate for variations in conditions affecting draw to vary the path of the bait during the draw, a drawing carriage mounted to gradually and automatically travel up said frame, in a path determined by the adjustment of the vertical frame, a bait on said carriage, said bait provided with an air admitting opening, a tubular air conducting support for said bait, an air injecting arm leading from said support into air injecting relation to the opening in the bait, a pivoted take-down frame adapted to be swung into take-down relation to the bait and cylinder, cushions on said take-down frame, and means whereby the bait and cylinder may be transferred from the drawing frame to the cushions on the take-down frame.

5. In an apparatus for drawing and taking down glass cylinders, in combination, a vertical frame, adjustable in a vertically inclined plane to compensate for variations in conditions affecting draw to vary the path of the bait during the draw, a drawing carriage mounted to gradually and automatically travel up said frame, in a path determined by the adjustment of the vertical frame, a handled bait on said carriage, a pivoted cushioned take-down frame for said bait and cylinder, the said take-down frame being stepped away from said pivot towards the tank, so that when said frame is swung into position for receiving the bait and cylinder, it will be parallel to and close to the cylinder, and an arm on said take-down frame to support the bait and cylinder until they come to be supported entirely by the cushion of the take-down frame.

6. In combination, a glass drawing machine comprising adjustable guide-ways, a drawing carriage with means for raising and lowering it on said ways, a flexible air supply conduit leading to said carriage, a bait with a hollow support adapted to removably suspend and make air connections to said carriage, a take-down frame independent from said guideways pivoted at its base and having a support for the bait handle, and means for raising said frame after draw to a position such that upon lowering said carriage the bait handle meets and pivotally rests upon said bait handle support, means for lowering said frame to any position from vertical to horizontal, and yielding supports on said frame upon which supports the bait and the cylinder supported thereby, may swing to rest in the take-down act of the frame.

7. A hollow bait having a relatively small air admission opening to the free atmosphere, a hollow pipe handle to said bait, said handle having an air discharge outlet or jet pipe open to the atmosphere arranged in air-injecting relation to said air admission opening in the bait and a bait carriage having a part co-operating with said hollow handle.

8. A bait having a relatively small opening in its top to the free atmosphere, and a hollow handle to said bait provided with means whereby it may be removably suspended to a drawing device, an air discharge outlet or jet pipe spaced in air supplying relation to said top opening of the bait and a bait carriage having a part co-operating with said hollow handle.

9. A hollow bait having a relatively small opening in its top to the free atmosphere, and a hollow pipe handle to said bait, said handle having a discharge or jet pipe open to the atmosphere adjacent to the top opening of the bait, means on said pipe handle whereby it may be removably suspended to air supplying apparatus and a bait carriage having a part co-operating with said hollow handle.

10. In glass drawing apparatus, in combination, a bait, a pipe handle on said bait, projections on said handle to removably suspend the bait upon a drawing device, a take-down apparatus, means on said apparatus adapted to engage said handle, whereby the bait and cylinder are supported to move or swing in any arc at the beginning of the take-down act and a bait carriage having a part co-operating with said hollow handle.

11. In glass drawing apparatus, in combination, a bait, a pipe handle for said bait, a single-point support idle during draw, to said bait handle, a tilting take-down apparatus, and a single arm on said take-down apparatus arranged to engage and lift said single-point support of the bait, whereby the bait and cylinder are supported free to move or swing in any arc at the beginning of the take-down act.

12. In glass drawing, a bait having a pipe hoop handle arranged to be removably suspended upon air supplying means to a drawing device, and a take-down apparatus having yielding supports, and an arm constructed to freely engage said hoop position of the pipe handle, whereby the bait and cylinder are supported free to swing to said yielding supports in the take-down act of said take-down apparatus.

13. In glass cylinder drawing apparatus, in combination, a bait provided with an air-injecting opening, a tubular handle for said bait arranged with a discharge opening in air injecting relation to said bait, an arm on said bait, said arm provided with an air passage, a frame, a bearing on said frame, air supply means, means on said frame for conducting air to said bearing, said arm adapted to be supported in said bearing, both arm and bearing being provided with openings, whereby when the bait is suspended there is a continuous air passage from the air supply to said bait opening.

14. In glass drawing apparatus, in combination, a bait, a pipe handle for said bait, a single-point support idle during draw, to said bait handle, a tilting take-down apparatus having yielding supports for the bait and cylinder at an angle thereto, and a single arm on said take-down apparatus arranged to engage and lift said single-point support of the bait, whereby the bait and cylinder are supported free to swing or move in any arc at the beginning of the take-down act, until they come to be supported entirely by the yielding support of the take-down frame.

15. In a device for drawing and handling glass objects, a bait for drawing the glass object, a swing-down supporting frame, and a spring on said frame to yieldingly support the drawing bait when the supporting frame carrying a drawn glass object, is swung to horizontal position with said bait.

In testimony whereof, I affix my signature.

ARTHUR E. SPINASSE.